(12) United States Patent
Ljung et al.

(10) Patent No.: US 7,940,270 B2
(45) Date of Patent: May 10, 2011

(54) COMPUTER PROCESSING OF MULTI-DIMENSIONAL DATA

(75) Inventors: Patric Ljung, Linköping (SE); Anders Ynnerman, Norrköping (SE)

(73) Assignee: Sectra AB, Linkoping (SE)

( * ) Notice: Subject to any disclaimer, the term of this patent is extended or adjusted under 35 U.S.C. 154(b) by 616 days.

(21) Appl. No.: 11/915,233

(22) PCT Filed: Oct. 13, 2005

(86) PCT No.: PCT/SE2005/001529
§ 371 (c)(1),
(2), (4) Date: Nov. 21, 2007

(87) PCT Pub. No.: WO2007/043922
PCT Pub. Date: Apr. 19, 2007

(65) Prior Publication Data
US 2008/0192052 A1    Aug. 14, 2008

(51) Int. Cl.
*G06T 17/00* (2006.01)
*G06T 15/00* (2011.01)
*G06K 9/00* (2006.01)

(52) U.S. Cl. ........ 345/428; 345/419; 382/130; 382/131; 382/132

(58) Field of Classification Search .................. 345/419, 345/428; 382/130–132, 232
See application file for complete search history.

(56) References Cited

U.S. PATENT DOCUMENTS

| | | | | |
|---|---|---|---|---|
| 5,727,084 A | * | 3/1998 | Pan et al. | 382/232 |
| 5,828,467 A | * | 10/1998 | Suzuki | 382/268 |
| 6,501,482 B1 | | 12/2002 | Rosman et al. | 345/587 |
| 7,050,641 B1 | * | 5/2006 | Kharitonenko | 382/240 |
| 7,830,381 B2 | * | 11/2010 | Lundstrom et al. | 345/428 |
| 2002/0191694 A1 | * | 12/2002 | Ohyama et al. | 375/240.01 |
| 2006/0110062 A1 | * | 5/2006 | Chiang et al. | 382/260 |

FOREIGN PATENT DOCUMENTS

WO    WO 2005104037 A2 *  11/2005

OTHER PUBLICATIONS

Ljung et al., *Effective Multi-Resolution Direct Volume Rendering*, VISIMOD, Visualization Simulation Modelling, Swedish Foundation for Strategic Research, 1 page, 2003-2005,. internal non-published document.

Ljung, Patric, *Transfer Function Based Adaptive Decompression for Volume Rendering of Large medical Data Sets*, IEEE Symposium on Volume Visualization and Graphics 2004, 8 pages, Oct. 11-12, 2004.

International Search Report and Written Opinion dated May 29, 2006 for corresponding PCT application No. PCT/SE2005/001529 (9 pages).

Ljung et al., *Multiresolution Interblock Interpolation in Direct Volume Rendering*, The Eurographics Association 2006, 8 pages, May 8-10, 2006.

* cited by examiner

*Primary Examiner* — Ulka Chauhan
*Assistant Examiner* — Roberta Prendergast
(74) *Attorney, Agent, or Firm* — Myers Bigel Sibley & Sajovec, P.A.

(57) ABSTRACT

The present invention relates to a solution for processing source data into target data. A rim distance ($\delta_4$) between the block sample boundary ($\beta_{SB}$) and the block edge ($b_4$) is relatively short for a comparatively high resolution level (r3), and the rim distance ($\delta_1$) is relatively long for a comparatively low resolution level (r0). In connection with the production of the target data ($D_T$) at least one interpolation parameter ($\rho_{S1}$, $e(P_{S1})$) is determined for at least one interpolated sample between a first block (B2) neighboring a second block (B3) at least based on a first rim distance ($\delta_2$) of the first block (B2) and a second rim distance ($\delta_3$) of the second block (B3).

28 Claims, 4 Drawing Sheets

PRIOR ART

COMPUTER PROCESSING OF MULTI-DIMENSIONAL DATA

RELATED APPLICATIONS

This application is a 35 USC §371 national phase application of PCT application no. PCT/SE2005/001529, filed Oct. 13, 2005, the entire contents of which are incorporated by reference herein.

THE BACKGROUND OF THE INVENTION AND PRIOR ART

The present invention relates generally to computer processing of multi-dimensional data, e.g. in 3D. More particularly the invention relates to a system according to the preamble of claim 1 and a method according to the preamble of claim 11. The invention also relates to a computer program according to claim 27 and a computer readable medium according to claim 28.

The size and complexity of the data amounts that today's computers must handle is often challenging in many ways. For example, the processing demand placed by volumetric data from simulations and medical imaging for interactive viewing can rapidly become immense. In practice, however, this problem may be reduced substantially due to various inherent data properties, as well as user-set parameters. Namely, most voxels in a volume to be viewed may either be rendered completely transparent, or be obscured by voxels representing other image parts. In computer imaging, a so-called transfer function (TF) is normally used to describe which image parts that shall be visible, and to what extent, in a particular visualization or view of the data.

Figure 1:
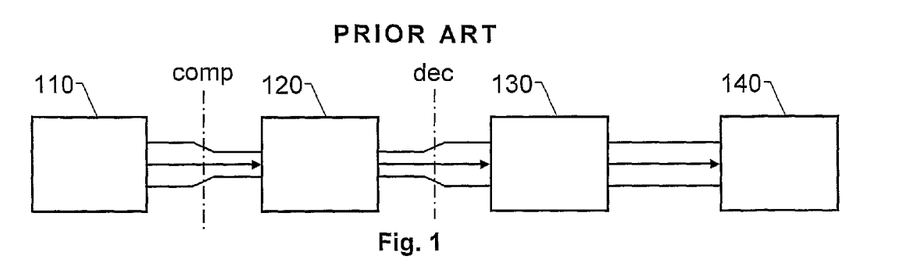
FIG. 1 shows a general block diagram over a prior-art system for processing three-dimensional image data.

FIG. 1 which shows a general block diagram over a prior-art system for processing three-dimensional image data. The system includes a primary unit 110, a long-term storage means 120, a temporary storage means 130 and a presentation unit 140, such as a graphics processor. The primary unit 110 is adapted to produce source data, for instance as the result of a simulation or measurement process. The primary unit 110 then compresses the data, either losslessly or lossy, and stores the source data in the compressed format in the long-term storage means 120. Thereby, the storage, resources thereof are economized. However, in connection with further processing of the data, for example in visualization, the source data must be decompressed and transferred to the temporary storage means 130. At this stage, the amount of data is often comparable to the original amount of source data that was produced by the primary unit 110. Thus, the presentation unit 140 must typically handle a very large amount of data, and much of the efficiency gained in the compression is lost in the following processing pipeline.

The article Ljung, P. et al., "Transfer Function Based Adaptive Decompression for Volume Rendering of Large Medical Data Sets", Proceedings IEEE Volume Visualization and Graphics Symposium, pp 25-32, 2004, describes how medical knowledge embedded in the TF can be exploited to reduce the required bandwidth of a direct volume rendering pipeline for producing medical images, for instance based on computer tomography data. Thus, parts of a data volume can be represented at low resolution while retaining an overall high visual quality. A level-of-detail (LOD) scheme here defines which parts of the data set that shall be presented at a specific resolution in a particular visualization of the data. Based on the LOD scheme, a multi-resolution data set represented by means of compressed wavelet transformed blocks can be adaptively decompressed at a maintained high rendering quality while significantly reducing the required amount of data in the rendering pipeline.

Although the above-described approach using multi-resolution data sets and LOD schemes is very resource efficient, certain practical problems remain to be solved. For example, at the block boundaries between data blocks representing different resolution levels artifacts may occur that deteriorate the visual impression. Typically, the resulting images are perceived as blocky. Of course, similar boundary effects (i.e. undesired discontinuities in the target data) may arise also in cases where the data set represents other information than 3D images, such as meteorological data, or map data.

SUMMARY OF THE INVENTION

The object of the present invention is therefore to provide a solution, which alleviates the above problems and thus offers an adaptive processing of multi-dimensional data represented at multiple resolution levels that is capable of handling the entire processing chain in an efficient manner, and thus allow full exploitation of the advantages that are technically attainable by the above-mentioned multi-resolution approach.

According to one aspect of the invention, the object is achieved by the system as initially described, wherein it is presumed that a block sample boundary around each block is defined by a set of surfaces spanned by at least one sample, which in each respective dimension of the information space is positioned a longest distance from a geometric center point of this block. Moreover, a rim distance between the block sample boundary and the block edge is defined, which rim distance is relatively short for a comparatively high resolution level. Contrary, for a comparatively low resolution level, the rim distance is relatively long. In connection with the production of the target data, the processing means is adapted to determine at least one interpolation parameter for at least one interpolated sample between a first block neighboring a second block on the basis of a first rim distance of the first block and a second rim distance of the second block.

An important advantage of this system is that the proposed interpolation parameters accomplish a target data set having smooth block transitions. Thus, if the data represents image information, the target data will be well suited for visual presentation. In the general case, however, the data can be optimized for further computer processing or analysis.

According to one preferred embodiment of this aspect of the invention, the target data has a format, which is adapted to be processed by a graphics processor to provide data for graphical presentation on a display.

According to another preferred embodiment of this aspect of the invention, the source data represents three-dimensional information, and each data block represents a respective volumetric information space of the source data. The system is namely highly suitable for handling such three-dimensional imaging. Therefore, preferably, the processing means is further adapted to render a visualization of a particular view of this data.

According to yet another preferred embodiment of this aspect of the invention, the at least one interpolation parameter includes at least one interpolated sample position and at least one sample value. Furthermore, the processing means is adapted to calculate each interpolated sample position, and a respective sample value associated thereto, on the further basis of at least one sample value of the first block and at least one sample value of the second block. Hence, an interpolation is attained, which renders the block transitions mathematically smooth.

According to still another preferred embodiment of this aspect of the invention, each of the blocks represents a cubic space of a particular volume, and the processing means is adapted to determine the interpolation parameters over the interior of each sub-block eighth of a block, which neighbors a block having a resolution level different from the resolution level of the block itself. Consequently, the interpolation parameters are determined in respect of all concerned blocks in the target data.

According to yet another preferred embodiment of this aspect of the invention, the processing means is adapted to, for each block intersection of said sub-block, blend the sample values from the block with the sample values of neighboring blocks. Specifically, an edge weight for each edge is determined of each first and second block adjoining the intersection according to:

$$e_{i,j}(\rho) = \max\left(0, \min\left(1, \frac{\rho + \delta_i}{\delta_i + \delta_j}\right)\right).$$

In this expression, $\rho$ denotes one of the at least one interpolation parameters; $\rho \in [-½, ½]$, $\delta_i$ is the rim distance of the first block adjacent to the edge along the dimension, and $\delta_j$ is the rim distance of the second block adjacent to the edge along the dimension. Such a blending accomplishes desirable results in most two-dimensional applications, and may be referred to as a maximum-distance interpolation.

Also in case the information space is three-dimensional, it is preferable to apply a corresponding blending algorithm. However, since here each sub-block has three sets of edges, where each set includes four edges oriented in each respective dimension of the cubic space, the calculation becomes somewhat more complex. Specifically, an interpolated sample value $\phi$ for the sub-block is determined according to:

$$\varphi = \frac{\sum_{b=1}^{8} \omega_b \varphi_b}{\sum_{b=1}^{8} \omega_b}$$

where $\omega_1 = (1-e_{1,2}) \cdot (1-e_{1,3}) \cdot (1-e_{1,5})$;
$\omega_2 = e_{1,2} \cdot (1-e_{2,4}) \cdot (1-e_{2,6})$;
$\omega_3 = (1-e_{3,4}) \cdot e_{1,3} \cdot (1-e_{3,7})$;
$\omega_4 = e_{3,4} \cdot e_{2,4} \cdot (1-e_{4,8})$;
$\omega_5 = (1-e_{5,6}) \cdot (1-e_{5,7}) \cdot e_{1,5}$;
$\omega_6 = e_{5,6} \cdot (1-e_{6,8}) \cdot e_{2,6}$;
$\omega_7 = (1-e_{7,8}) \cdot e_{5,7} \cdot e_{3,7}$;
$\omega_8 = e_{7,8} \cdot e_{6,8} \cdot e_{4,8}$, and $e_{1,2}$; $e_{3,4}$; $e_{5,6}$; $e_{7,8}$; $e_{1,3}$; $e_{2,4}$; $e_{5,7}$; $e_{6,8}$; $e_{1,5}$; $e_{2,6}$; $e_{3,7}$ and $e_{4,8}$ represent the edge positions of the individual edges in the first, second and third sets of edges.

Moreover, in the three-dimensional case, according to one preferred embodiment of the invention, a position $e_{i,j}(\rho)$ for a particular edge of said sub-block is determined according to:

$$e_{i,j}(\rho) = C_0^1\left(0, 5 + \frac{\rho}{2\min(\delta_i, \delta_j)}\right)$$

where $e_{i,j} \in [0,1]$, $(i,j) \in E_\rho$, and $\rho$ represents one of the three dimensions of the cubic space. Thereby, a minimum-distance interpolation is attained. Such an interpolation is advantageous in that discontinuities in the derivative of the interpolation parameter are avoided, while obtaining a significant extension of any samples that represent a relatively low resolution level. Here, the position is interpolated in one linear segment over the distance between the neighboring samples.

Alternatively, a boundary-split interpolation may be performed, i.e. wherein neighboring blocks does not influence the steepness of the interpolation. To this aim, the interpolation is divided into a two-segment linear function, which is split at the spatial block boundary. As a result, sample values representing a relatively high resolution level are generally extended and any constant-level regions associated with low resolution volumes are removed. Mathematically, this means that the position $e_{i,j}(\rho)$ for a particular edge of said sub-block is determined according to:

$$e_{i,j}(\rho) = \begin{cases} C_0^1(0, 5 + \rho/2\delta_i) & \text{if } \rho < 0 \\ C_0^1(0, 5 + \rho/2\delta_j) & \text{if } \rho \geq 0 \end{cases}$$

where $e_{i,j} \in [0,1]$, $(i,j) \in E_\rho$, and $\rho$ represents one of the dimensions of the cubic space.

According to one further preferred embodiment of the invention, a position $e_{i,j}(\rho)$ for a particular edge of said sub-block is determined according to:

$$e_{i,j}(\rho) = C_0^1\left(\frac{\rho + \delta_i}{\delta_i + \delta_j}\right)$$

where $e_{i,j} \in [0,1]$, $(i,j) \in E_\rho$, and $\rho$ represents one of the dimensions of the cubic space. Here, no sample value has an impact outside its valid footprint, with respect to its resolution level. Consequently, sample values representing a relatively low resolution level are extended without interpolating any part of the distance to the edge.

Irrespective of which interpolation strategy that is used, all the data blocks may either represent an equally large space of the source data, or the source data may be divided into a number of equally large minimum sub-spaces, and each data block represent a space that is equivalent to a multiple of one minimum sub-space.

According to another preferred embodiment of this aspect of the invention, the blocks are associated with block meta data describing a resolution hierarchy for the source data. Namely, this simplifies the proposed interpolation process.

According to one further preferred embodiment of this aspect of the invention, the level-of-detail is derived from a transfer function. The processing means is adapted to apply the transfer function to meta data associated with the source data to accomplish a level-of-detail selection. The processing means is also adapted to decompress the source data into the target data based on the level-of-detail selection. Alternatively, the processing means is adapted to derive the level-of-detail for a particular block based on a distance between a viewpoint and the block and/or a view-dependent parameter, which reflects whether the block is visible or not. Of course, non visible blocks may here be given a lowest possible level-of-detail. However, also blocks which due to the relative distance to the viewer will appear very small can be allocated a low level-of-detail, whereas more closely located blocks preferably are allocated a comparatively high level-of-detail.

According to another aspect of the invention, the object is achieved by the initially described method, wherein a block sample boundary around each block is defined by a set of surfaces spanned by at least one sample which in each respective dimension of the information space is positioned a longest distance from a geometric point of this block. It is further presumed that a rim distance between the block sample boundary and the block edge is relatively short for a comparatively high resolution level, and contrary, that the rim distance is relatively long for a comparatively low resolution level. The method involves determining at least one interpolation parameter for at least one interpolated sample between a first block neighboring a second block at least based on a first rim distance of the first block and a second rim distance of the second block.

The advantages of this method, as well as the preferred embodiments thereof, are apparent from the discussion hereinabove with reference to the proposed alarm apparatus.

According to a further aspect of the invention the object is achieved by a computer program, which is directly loadable into the internal memory of a computer, and includes software for controlling the above proposed method when said program is run on a computer.

According to another aspect of the invention the object is achieved by a computer readable medium, having a program recorded thereon, where the program is to control a computer to perform the above proposed method.

Further advantages, advantageous features and applications of the present invention will be apparent from the following description and the dependent claims.

BRIEF DESCRIPTION OF THE DRAWINGS

The present invention is now to be explained more closely by means of preferred embodiments, which are disclosed as examples, and with reference to the attached drawings.

DESCRIPTION OF PREFERRED EMBODIMENTS OF THE INVENTION

Figure 2:
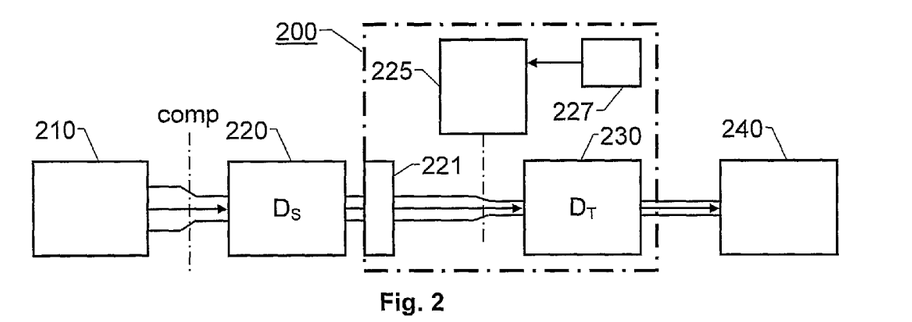
FIG. 2 shows a block diagram over a proposed system according to one embodiment of the invention.

We refer initially to FIG. 2, which shows a block diagram over a system 200 for processing source data into target data according to one embodiment of the invention. The system 200 includes a processing means 225, an interface 221 and a temporary storage means 230.

The processing means 225 is adapted to accomplish the processing of the source data $D_S$, such that resulting target data $D_T$ is produced. The interface 221 is presumed to be connected to a long-term storage means 220, wherein the source data $D_S$ is stored. The interface 221 is adapted to receive the source data $D_S$ from the long-term storage means 220 and forward this data $D_S$ to the processing means 225. The temporary storage means 230, which may be of RAM-type, is adapted to store the target data $D_T$ produced by the processing means 225. (RAM=Random Access Memory).

The long-term storage means 220, may be represented by arbitrary type of non-volatile memory, such as a hard disc, a diskette, a CD (Compact Disc), a DVD (Digital Video/Versatile Disk) or a remote storage resource accessible via a computer network. Preferably, the system 200 also includes, or is at least associated with, a computer readable medium 227 carrying a program which is adapted to make the processing means 225 execute the procedure described below.

Figure 3:
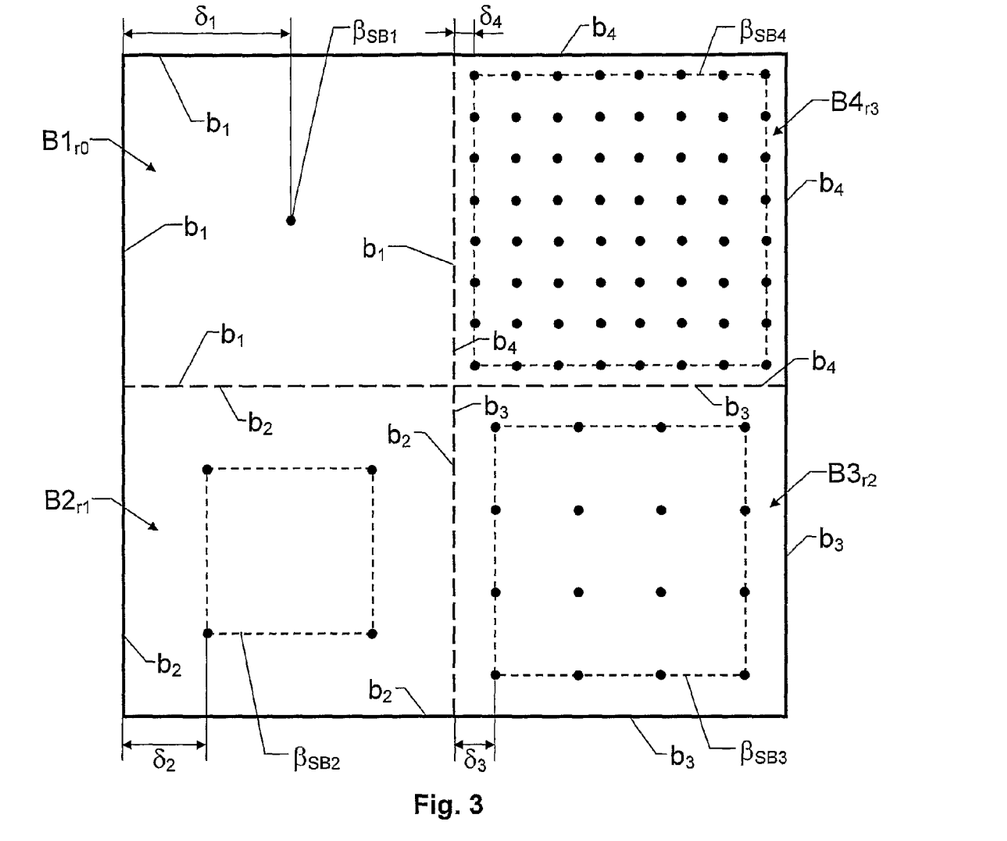
FIG. 3 illustrates how block sample boundaries are associated with blocks representing different resolution levels according to one embodiment of the invention.

According to the invention, the target data $D_T$ is compressed relative to the source data $D_S$, i.e. the target data $D_T$ represents a further reduced amount of data. It is presumed that the source data $D_S$ is divided into a number data blocks, which each represents an information space having at least two dimensions, typically three. FIG. 3 shows four neighboring blocks B1, B2, B3 and B4, which for reasons of a clear presentation, here are two-dimensional. The blocks B1, B2, B3 and B4 are delimited by a respective set of block edges $b_1$, $b_2$, $b_3$ and $b_4$. In this example, the blocks B1, B2, B3 and B4 have been allocated a respective resolution level r0, r1, r2 and r3 of four selectable levels. According to the invention, at least two resolution levels exist, which may be selected individually based on an LOD scheme. Thus, different blocks can represent information at different resolution levels.

Here, a first block B1 has a lowest resolution level r0, which means that the block B1 only contains one sample value located at a center point of the block B1. A second block B2 has a second lowest resolution level r1, which means that the block B2 contains four sample values that are distributed within the block edges $b_2$. A third block B3 has a second highest resolution level r2, which means that the block B3 contains 16 sample values that are distributed within the block edges $b_3$. Finally, a fourth block B4 has a highest resolution level r3, which means that the block B4 contains 64 sample values that are distributed within the block edges $b_4$. Moreover, a block sample boundary $\beta_{SB1}$, $\beta_{SB2}$, $\beta_{SB3}$ and $\beta_{SB4}$ around each block B1, B2, B3 and B4 respectively is defined by a set of lines extending between those samples in each block, which are located a longest distance from a geometric center point of the block, i.e. the block sample boundary is the smallest block containing all the samples of the block. In a general three-dimensional case, this is equivalent to the block sample boundaries being spanned by at least one sample, which in each respective dimension of the information space is positioned a longest distance from a geometric center point of this block.

Rim distances $\delta_1$, $\delta_2$, $\delta_3$ and $\delta_4$ are also defined between each block sample boundary $\beta_{SB1}$, $\beta_{SB2}$, $\beta_{SB3}$ and $\beta_{SB4}$ and the respective block edge $b_1$, $b_2$, $b_3$ and $b_4$. Thus, the rim distance $\delta_4$ between the block sample boundary $\beta_{SB4}$ and the block edge $b_4$ is relatively short for a block B4 having a comparatively high resolution level r3. Correspondingly, the rim distance $\delta_1$ between the block sample boundary $\beta_{SB1}$ and the block edge $b_1$ is relatively long for a block B1 having a comparatively low resolution level r0.

According to the invention, the processing means 225 is adapted to determine at least one interpolation parameter for at least one interpolated sample between each first block, e.g. B2, which neighbors a second block, e.g. B3, containing samples of a different resolution level than the block itself. The at least one interpolation parameter is determined at least on the basis of the rim distance $\delta_2$ of the first block B2 and the second rim distance $\delta_3$ of the second block B3. The processing means 225 determines these interpolation parameters in connection with the production of the target data $D_T$.

Analogous to the system shown in the FIG. 1, the system 200 is preferably adapted to be connected to a primary unit 210 and a post-processing unit 240 to produce the source data $D_S$ and handle the target data $D_T$ respectively.

According to one preferred embodiment of the invention, the source data $D_S$ represents image data and the processing means 225 is adapted to render a visualization of a particular view of this data. It is therefore also desirable that the target data $D_T$ has a format, which is adapted to be processed by a post-processing unit 240 containing a graphics processor, so that data can be provided for graphical presentation on a display.

In order to explain some important aspects of the proposed solution, the discussion below refers to an image-processing example based on the data blocks B1, B2, B3 and B4 shown in the FIG. 3. As can be seen, irrespective of which resolution level that a particular block has, all blocks have the same extension, and therefore the samples are here placed differently within the blocks depending on the resolution level r0, r1, r2 or r3.

An intrablock sampling is equivalent to the operation of finding a correct block, and then calculating texture coordinates for the sample within the block. This process can be described as follows. Due to the above definition of the block sample boundaries $\beta_{SB1}$, $\beta_{SB2}$, $\beta_{SB3}$ and $\beta_{SB4}$, these boundaries are offset inwards from the block edges $b_1$, $b_2$, $b_3$ and $b_4$ of the blocks B1, B2, B3 and B4 respectively. This varying offset is inter alia a result of the wavelet transform, where each lower resolution sample resides in the center point of its corresponding higher resolution samples, i.e. the single sample in block B1 is centered relative to the four samples of block B2, and so on. Generally, for each resolution level, L, the offset (or rim distance), $\delta$, is calculated as:

$$\delta(L) = \frac{1}{2^{1+L}}$$

The resolution level, L, also defines a size, $\sigma$, of a block according to the expression: $\sigma(L) = 2^L$.

The sample to be retrieved is given by a set of intrablock coordinates: $u'$, $v'$, $w' \in [0, 1]$. The computation of local block coordinates $u$, $v$, $w$ according to:

$u = \min(1-\delta, \max(\delta, u'))$;

$v = \min(1-\delta, \max(\delta, v'))$; and $w = \min(1-\delta, \max(\delta, w'))$ respectively ensures that no samples are taken from outside the block edges $b_1$, $b_2$, $b_3$ or $b_4$.

As an alternative to the wavelet transform, all the lower resolution levels (i.e. down to a single sample) of the source data may be calculated on beforehand and be stored together with the source data. This so-called MIP mapping requires a relatively small amount of additional storage space (for 3D data approximately 13%, and 2D data around 32%) [MIP—Latin: multim im parvo, which means "many things in a small space."].

In order to find texture coordinates x, y, z, information pertaining the size, $\sigma$, and the origin $u_0$, $v_0$, $w_0$ of the block is required. According to one preferred embodiment of the invention, this information is looked up in an index data structure, which is associated with the source data $D_S$ and describes such meta data for the block plus a resolution hierarchy. Since the texture coordinates reside in the interval [0, 1], the side sizes of the allocated texture, $\kappa_x$, $\kappa_y$, $\kappa_z$, are also required. This gives us the total expression:

$$<x, y, z> = \left\langle \frac{\sigma u + u_0}{\kappa_x}, \frac{\sigma v + v_0}{\kappa_y}, \frac{\sigma w + w_0}{\kappa_z} \right\rangle$$

Storing the volume in a texture memory is straightforward. Preferably, the blocks B1, B2, B3 and B4 are stored in descending resolution order, since this allows a tight packing. For simplicity however, it is desirable not to pack different resolution levels directly after one another. Instead, each level should begin on an offset aligned with the largest block size. The resulting loss in actual compression is insignificant for any useful compression ratios. Provided 3D image data, at most a storage space for $(\lambda-1)S^3$ voxels is wasted, where $\lambda$ is the number of resolution levels used and S is the size of the cubical block side for the highest resolution level.

Nevertheless, the above-described intrablock sampling scheme as such causes artifacts at the block edges $b_1$, $b_2$, $b_3$ and $b_4$. Any samples taken outside the space spanned by the samples will become clamped analogous to what is provided by the traditional OpenGL texture sampling scheme Clamp-to-Edge.

Figure 4:
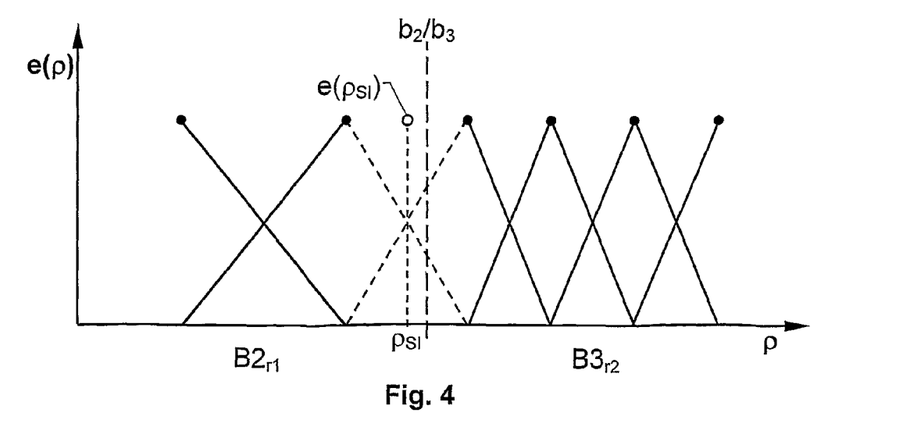
FIG. 4 illustrates schematically how an interpolation parameter is calculated between blocks representing different resolution levels according to one embodiment of the invention, FIG. 5a demonstrates how an edge position is calculated by means of maximum distance interpolation between blocks representing different resolution levels according to a first embodiment of the invention, FIG. 5b demonstrates how an edge position is calculated by means of minimum distance interpolation between blocks representing different resolution levels according to a second embodiment of the invention, FIG. 5c demonstrates how an edge position is calculated by means of boundary split interpolation between blocks representing different resolution levels according to a third embodiment of the invention.

Below follows a description of proposed interblock interpolation strategies. FIG. 4 shows a graph, which illustrates, in one dimension, how one of the above-mentioned interpolation parameters, namely a position $\rho_{SI}$, may be calculated for an interpolated edge $e(\rho_{SI})$ between blocks B2 and B3. These blocks represent different resolution levels r1 and r2 respectively. Specifically, a rightmost block B3 has a resolution level r2, which is higher than a resolution level r1 of a leftmost block B2. See also the FIG. 3. The horizontal axis $\rho$ represents the locations and spatial extensions of the blocks B2 and B3. Interpolation filters for block-interior samples (shown as bold circles) are schematically represented in the form of angled lines relative to the vertical axis $e(\rho)$ and the horizontal axis $e(\rho)$. A block edge $b_2/b_3$ denotes the division between the two blocks B2 and B3, and as can be seen here, the interpolated edge $e(\rho_{SI})$ is positioned $\rho_{SI}$ on the B2-side of the block edge $b_2/b_3$. This means that the relatively high-resolution sample of the rightmost block B3 closest to the block edge $b_2/b_3$ is extended into the leftmost block B2, which has a relatively low resolution level r1.

Figure 5A:
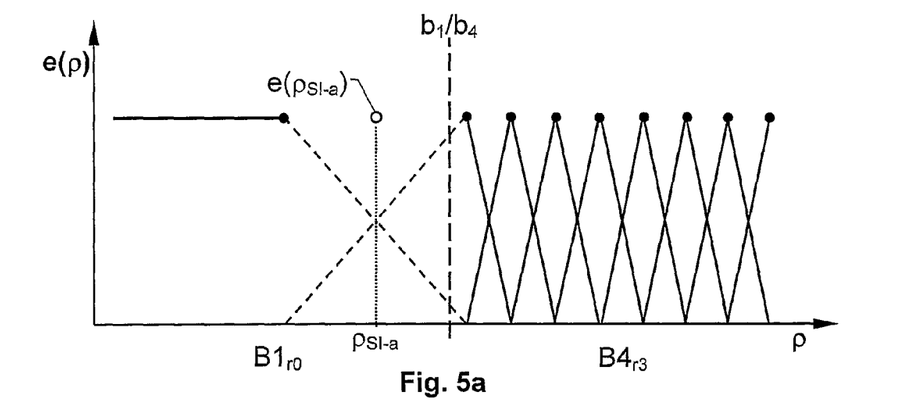

To further elucidate this principle, we now refer to FIG. 5a, which demonstrates another one-dimensional example of how an edge position $\rho_{SI-a}$ is calculated by means of maximum distance interpolation. In this example, a rightmost block B4 has a resolution level r3, which is considerably higher than a resolution level r0 of a leftmost block B1. Again, see also the FIG. 3.

For the block intersection $b_1/b_4$ between the blocks B1 and B4, the edge is positioned $\rho_{SI-a}$, such that the high-resolution sample of the block B4 is extended as much as possible into the low-resolution region of the block B1. Thereby, there will be no discontinuity in the derivative of the interpolation parameter.

An edge weight $e(\rho_{SI-a})$ for the interpolated parameter is determined according to:

$$e(\rho_{SI-a}) = \max\left(0, \min\left(1, \frac{\rho_{SI-a} + \delta_1}{\delta_1 + \delta_4}\right)\right),$$

where the edge position $\rho_{SI-a} \in [-\frac{1}{2}, \frac{1}{2}]$, $\delta_1$ is the rim distance of the block B1, and $\delta_4$ is the rim distance of the block B4.

Figure 6:
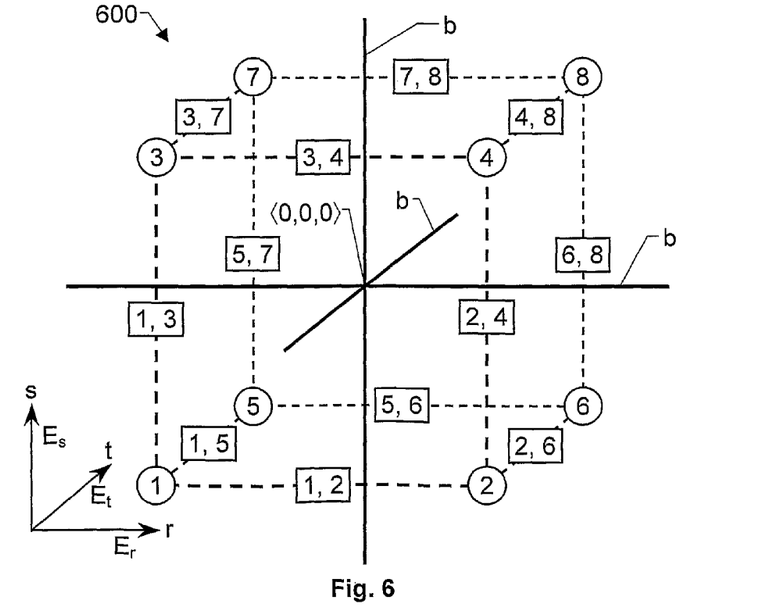
FIG. 6 shows a center of a neighborhood of a sub-block eighth in a cubic space and how the block edges in this region are labeled according to one embodiment of the invention.

In order to explain how this maximum distance interpolation is accomplished in three dimensions, we turn now to FIG. 6, which shows a center of a neighborhood of a sub-block eighth 600. Here, eight different data blocks adjoin one another along three intersections b.

A first vertex 1 denotes a center point of a first block located to the bottom-left-front, a second vertex 2 denotes a center point of a second block located to the bottom-right-front, a third vertex 3 denotes a center point of a third block located to the top-left-front, a fourth vertex 4 denotes a center point of a fourth block located to the top-right-front, a fifth vertex 5 denotes a center point of a fifth block located to the bottom-left-back, a sixth vertex 6 denotes a center point of a sixth block located to the bottom-right-back, a seventh vertex 7 denotes a center point of a seventh block located to the top-left-back, and an eighth vertex 8 denotes a center point of an eighth block located to the top-right-back.

A first edge label (1,2) denotes a first edge between the first vertex 1 and the second vertex 2, a second edge label (1,3) denotes a second edge between the first vertex 1 and the third vertex 3, a third edge label (2,4) denotes a third edge between the second vertex 2 and the fourth vertex 4, a fourth edge label (3,4) denotes a fourth edge between the third vertex 3 and the fourth vertex 4, a fifth edge label (1,5) denotes a fifth edge between the first vertex 1 and the fifth vertex 5, a sixth edge label (2,6) denotes a sixth edge between the second vertex 2 and the sixth vertex 6, a seventh edge label (3,7) denotes a seventh edge between the third vertex 3 and the seventh vertex 7, an eighth edge label (4,8) denotes an eighth edge between the fourth vertex 4 and the eighth vertex 8, a ninth edge label (5,6) denotes a ninth edge between the fifth vertex 5 and the seventh vertex 6, a tenth edge label (5,7) denotes a tenth edge between the fifth vertex 5 and the seventh vertex 7, an eleventh edge label (6,8) denotes an eleventh edge between the sixth vertex 6 and the eighth vertex 8, and a twelfth edge label (7,8) denotes a twelfth edge between the seventh vertex 7 and the eighth vertex 8.

In order to retrieve a value for a position outside the sample boundary of a block, the following strategy is applied. First, a current eight-block neighborhood is determined. Then, a sample is taken from each of the blocks in this neighborhood using the method described above with reference to the FIG. 3. However, the specific position of this sample differs depending on which type of interpolation that is performed.

Thereafter, the final value is computed as a weighted sum of the individual block samples. Index data and addressing for multi-resolved packed volume data is preferably handled in the same manner as already described above.

The sub-block eighth 600 of FIG. 6 stretches from each center 1, 2, 3, 4, 5, 6, 7 and 8 of the eight neighboring blocks. The domain over which the interpolation parameters are computed thus covers one eighth of each block's interior domain. The frame of reference for the coordinates of a larger neighborhood is translated, such that the origin $\langle 0,0,0 \rangle$ is located at the intersection of all eight blocks. A coordinate system r, s, t denotes this local coordinate. The coordinates are also normalized, such that the coordinate of the block center 1 is $\langle -0.5, -0.5, -0.5 \rangle$ and the coordinate of the block center 8 is $\langle 0.5, 0.5, 0.5 \rangle$.

Provided the global texture coordinates $r_g$, $s_g$, $t_g$ for the sample to calculate, the local coordinates are given by:

$$r = C_0^{N-1}(\kappa_r r_g - 0.5),$$

where $C_\alpha^\beta(\gamma)$ clamps the value $\gamma$ to the interval $[\alpha, \beta]$, N is the number of blocks along the current dimension (i.e. here r), and $\kappa_r = \min_i(2^i \geq N)$ due to a power-of-two restriction presumed to be applied to the 3D texture. The local coordinates for the remaining two dimensions s and t are computed analogously.

The final value is a weighted sum of all eight samples, one from each block in the neighborhood of the sub-block eighth 600. The coordinate system r, s, t indicates a respective dimension r, s and t of the cubic space. Three sets of edges $E_r$, $E_s$ and $E_t$ collectively denote each group of edges that are oriented in each respective dimension r, s and t, i.e. $E_r = \{(1,2), (3,4), (5,6), (7,8)\}$, $E_s = \{(1,3), (2,4), (5,7), (6,8)\}$ and $E_t = \{(1,5), (2,6), (3,7), (4,8)\}$.

With this notation, an interpolated sample value $\phi$ for the sub-block 600 is determined according to:

$$\varphi = \frac{\sum_{b=1}^{8} \omega_b \varphi_b}{\sum_{b=1}^{8} \omega_b}$$

where
 $\omega_1 = (1-e_{1,2}) \cdot (1-e_{1,3}) \cdot (1-e_{1,5})$,
 $\omega_2 = e_{1,2} \cdot (1-e_{2,4}) \cdot (1-e_{2,6})$,
 $\omega_3 = (1-e_{3,4}) \cdot e_{1,3} \cdot (1-e_{3,7})$,
 $\omega_4 = e_{3,4} \cdot e_{2,4} \cdot (1-e_{4,8})$,
 $\omega_5 = (1-e_{5,6}) \cdot (1-e_{5,7}) \cdot e_{1,5}$,
 $\omega_6 = e_{5,6} \cdot (1-e_{6,8}) \cdot e_{2,6}$,
 $\omega_7 = (1-e_{7,8}) \cdot e_{5,7} \cdot e_{3,7}$,
 $\omega_8 = e_{7,8} \cdot e_{6,8} \cdot e_{4,8}$,
 $e_{1,2}$ is an edge position of a first edge (1,2) in a first set of edges, ($E_r$) of said sets of edges,
 $e_{3,4}$ is an edge position of a second edge (3,4) in the first set of edges ($E_r$),
 $e_{5,6}$ is an edge position of a third edge (5,6) in the first set of edges ($E_r$),
 $e_{7,8}$ is an edge position of a fourth edge (7,8) in the first set of edges ($E_r$),
 $e_{1,3}$ is an edge position of a first edge (1,3) in a second set of edges ($E_s$) of said sets of edges,
  $e_{2,4}$ is an edge position of a second edge (2,4) in the second set of edges ($E_s$),
 $e_{5,7}$ is an edge position of a third edge (5,7) in the second set of edges ($E_s$), $e_{6,8}$ is an edge position of a fourth edge (6,8) in the second set of edges ($E_s$), $e_{1,5}$ is an edge position of a first edge (1,5) in a third set of edges ($E_t$) in said sets of edges, $e_{2,6}$ is an edge position of a second edge (2,6) in the third set of edges ($E_t$), $e_{3,7}$ is an edge position of a third edge (3,7) in the third set of edges ($E_t$), and $e_{4,8}$ is an edge position of a fourth edge (4,8) in the third set of edges ($E_t$).

Preferably, the edge positions $e_{i,j}(\rho_{SI-a})$, in turn, are determined according to:

$$e_{i,j}(\rho_{SI-a}) = C_0^1 \left( \frac{\rho_{SI-a} + \delta_i}{\delta_i + \delta_j} \right)$$

where $e_{i,j}(\rho_{SI-a}) \in [0,1]$, $(i,j) \in E_\rho$, $\delta_i$ and $\delta_j$ denote relevant the rim distances, and $\rho$ represents one of the dimensions r, s or t of the cubic space.

Figure 5B:
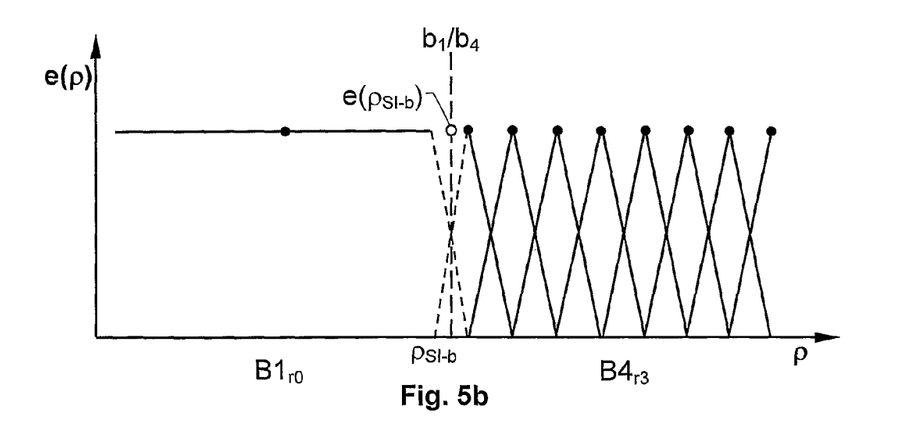

With reference to FIG. 5b, we will now describe an alternative strategy according to one embodiment of the invention for calculating an interpolated edge position $e(\rho_{SI-b})$ between a first block B4 having a relatively high resolution level r3, and a second block B1 having a relatively low resolution level r0. Again, see also the FIG. 3. In this case, a minimum distance interpolation is performed. Here, a sample value never has impact outside its valid footprint with respect to its resolution level. In other words, the edge position $e(\rho_{SI-b})$ always coincides with the block intersection $b_1/b_4$ between the blocks B1 and B4.

This may be expressed as:

$$e_{i,j}(\rho_{SI-b}) = C_0^1 \left( 0, 5 + \frac{\rho_{SI-b}}{2 \min(\delta_i, \delta_j)} \right)$$

where $e_{i,j}(\rho_{SI-b}) \in [0,1]$, $(i,j) \in E_\rho$, and $\rho$ represents one of the dimensions r, s and t of the cubic space.

Figure 5C:
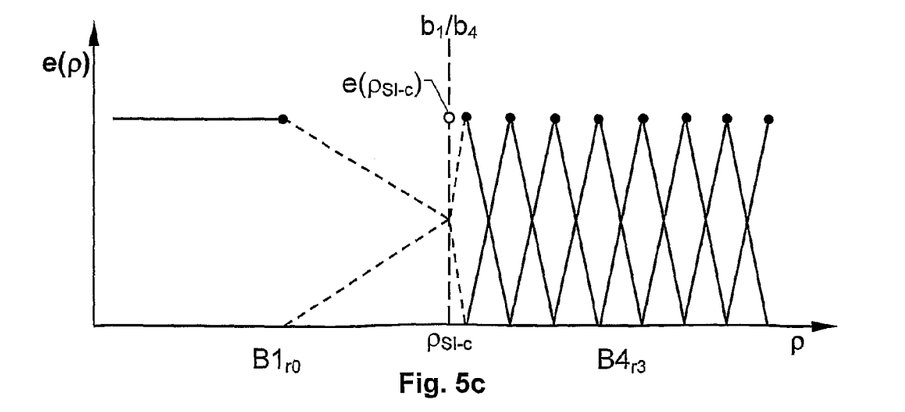

FIG. 5c demonstrates yet another alternative strategy for calculating an edge position $e(\rho_{SI-c})$ according to one embodiment of the invention. Here, a boundary split interpolation is performed between a first block B1 having a relatively low resolution r0, and a second block B4 having a relatively high resolution r3.

In this case, the steepness of the interpolation is not influenced by the resolutions of the neighboring blocks B1 and B4. To this aim, the interpolation is divided into a two-segment linear function, which splits at the spatial block intersection $b_1/b_4$. In comparison to the above-described minimum distance interpolation, the high resolution samples here extend further, and in similarity with the maximum distance interpolation any constant-level regions associated with low resolution volumes are removed.

This type of interpolation may be expressed as:

$$e_{i,j}(\rho_{SI-c}) = \begin{cases} C_0^1(0, 5 + \rho_{SI-b}/2\delta_i) & \text{if } \rho < 0 \\ C_0^1(0, 5 + \rho_{SI-b}/2\delta_j) & \text{if } \rho \geq 0 \end{cases}$$

where the edge position $e_{i,j}(\rho_{SI-c}) \in [0,1]$, $(i,j) \in E_\rho$, and $\rho$ represents one of the dimensions r, s and t of the cubic space.

Although, the FIGS. 5a, 5b and 5c illustrate interpolation in one dimension, the invention is generally applicable to the processing of source data $D_S$, which represent an information space in two or three dimensions. Furthermore, preferably all the data blocks into which the source data $D_S$ is divided each represent an equally large space of the source data $D_S$. However, according to the invention, the source data $D_S$ may instead be divided into a number of equally large-minimum sub-spaces, and each of the data blocks may represent a space that is equivalent to a multiple of one minimum sub-space. Thus, a first data block B1 in the data $D_S$ may represent a space $V_{min}$, while a second and a third data blocks B2 and B3 represent spaces $2V_{min}$ and $8V_{min}$ respectively.

As mentioned earlier, it is also preferable if the blocks in the source data $D_S$ are associated with block meta data, which describes a resolution hierarchy for the data $D_S$. Thereby, the processing in the processing means 225 is rendered significantly more efficient.

Moreover, the processing means 225 is preferably adapted to derive the LOD from a received TF. Specifically, the processing means 225 applies the TF to meta data associated with the source data $D_S$ to accomplish a LOD selection. Then, the processing means 225 the source data $D_S$ into the target data $D_T$ on the basis on the LOD selection.

According to another embodiment of the invention, the processing means 225 is instead adapted to derive the LOD for a particular block based on a distance between a viewpoint and the block and/or a view-dependent parameter, which reflects whether the block is visible or not. Namely, a block that is not visible in a certain view is preferably given a lowest possible LOD. Additionally, blocks which due to their distance to the viewer will appear very small can be allocated a relatively low LOD. Vice versa, blocks being located more closely to the viewer are preferably allocated a comparatively high LOD. This approach is particularly advantageous in 2D applications.

Figure 7:
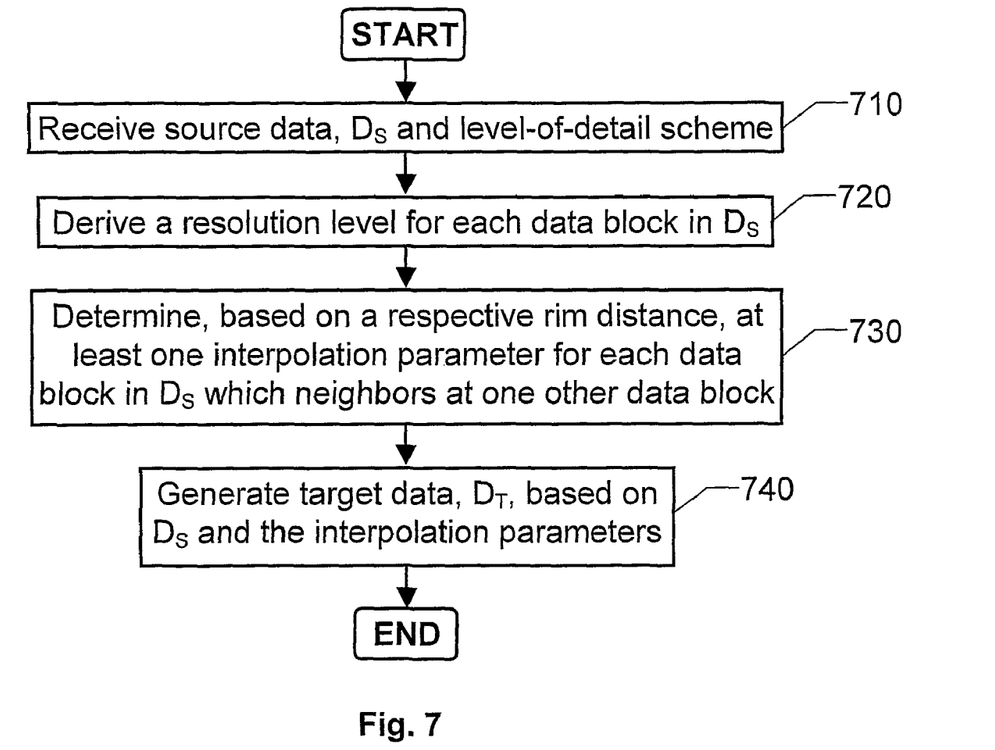
FIG. 7 illustrates, by means of a flow diagram, the general method according to the invention of processing source data into target data.

To sum up, the general method of controlling a computer apparatus to produce target data according to the invention will now be described with reference to the flow diagram in FIG. 7.

An initial step 710 receives source data and a LOD scheme, which is associated to this data. The source data is here divided into a number data blocks, where each block represents an information space having at least two dimensions. The blocks are delimited by a respective set of block edges. Further, the blocks have at least two selectable resolution levels, which are individually selected and defined by the LOD scheme. As a result, different blocks in the source data may represent information at different resolution levels. Then, based on the LOD scheme, a step 720 derives a resolution level for each block in the source data.

Subsequently, for each data block the source data that neighbors another data block having a different resolution level than the block itself, a step 730 determines at least one interpolation parameter based on a respective rim distance of the bocks concerned. The rim distance depends on a block sample boundary around each block. The block sample boundary, in turn, is defined by a set of surfaces spanned by at least one sample, which in each respective dimension of the information space is positioned a longest distance from a geometric point of the block. The rim distance is the distance between the block sample boundary and the block edge. Hence, the rim distance is relatively short for a block having a comparatively high resolution level, and the rim distance is relatively long for a comparatively low resolution level.

Finally, a step 740 generates the target data based on the source data and the interpolation parameters.

All of the process steps, as well as any sub-sequence of steps, described with reference to the FIG. 7 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope, of the claims.

The invention claimed is:

1. A method of processing source data ($D_S$) into target data ($D_T$), comprising:
    dividing, the source data($D_S$) into a number data blocks (B1, B2, B3, B4) each block representing an information space having, at least two dimensions, the blocks (B1, B2, B3, B4) being delimited by a respective set of block edges ($b_1$, $b_2$, $b_3$, $b_4$), the blocks (B1, B2, B3, B4) having at least two selectable resolution levels (r0, r1, r2, r3);
    selecting the resolution levels individually based on a level-of-detail scheme such that different blocks represent information at different resolution levels, characterized by, a block sample boundary ($\beta_{SB}$) around each block (B1, B2, B3, B4) being defined by a set of surfaces spanned by at least one sample which in each respective dimension (r, s, t) of the information space is positioned a longest distance from a geometric (1, 2, 3, 4, 5, 6, 7, 8) point of this block, a rim distance ($\delta_4$) between the block sample boundary ($\beta_{SB4}$) and the block edge ($b_4$) being relatively short for a comparatively high resolution level (r3), the rim distance ($\delta_1$) being relatively long for a comparatively low resolution level (r0); and
    determining at least one interpolation parameter ($\rho_{SI}$, $e(\rho_{SI})$) for at least one interpolated sample between a first block (B2) neighboring a second block (B3) at least based on a first rim distance ($\delta_2$) of the first block (B2) and a second rim distance ($\delta_3$) of the second block (B3).

2. The method according to claim 1, characterized by the source data ($D_S$) representing three-dimensional information and each data block (B1, B2, B3, B4) representing a respective volumetric information space of the source data ($D_S$).

3. The method according to claim 1, the at least one interpolation parameter ($\rho_{SI}$, $e(\rho_{SI})$) including at least one interpolated sample position ($\rho_{SI}$) and at least one sample value ($e(\rho_{SI})$), the method comprising calculating the at least one interpolated sample position ($\rho_{SI}$) and a respective sample value ($e(\rho_{SI})$) associated thereto on the further basis of at least one sample value of the first block (B2) and at least one sample value of the second block (B3).

4. The method according to claim 3, each of the blocks (B1, B2, B3, B4) representing a cubic space of a particular volume, and the method comprising determining the interpolation parameters over the interior of each sub-block eighth of a block which neighbors a block having a resolution level (r0, r1, r2, r3) different from the resolution level of the block itself.

5. The method according to claim 4, characterized by the method comprising, for each block intersection (b) and each dimension of said sub-block, determining an edge weight $e_{i,j}(\rho)$ for each edge of each block adjoining the intersection (b) according to:

$$e_{i,j}(\rho) = \max\left(0, \min\left(1, \frac{\rho + \delta_i}{\delta_i + \delta_j}\right)\right)$$

where
    $\rho$ is one of the at least one interpolation parameters;
    $\rho \in [-\frac{1}{2}, \frac{1}{2}]$,
    $\delta_i$ is the rim distance of a first block adjacent to the edge along the dimension, and
    $\delta_j$ is the rim distance of a second block adjacent to the edge along, the dimension.

6. The method according to claim 4, characterized by the information space being three-dimensional, and said sub-block having three sets of edges ($E_r$, $E_s$, $E_t$) each set comprising four edges ($\{(1,2), (3,4), (5,6), (7,8)\}$, $\{(1,3), (2,4), (5,7), (6,8)\}$, $\{(1,5), (2,6), (3,7), (4,8)\}$) being oriented in each respective dimension (r, s, t) of the cubic space, the method comprising determining an interpolated sample value $\phi$ for the sub-block according to:

$$\varphi = \frac{\sum_{b=1}^{8} \omega_b \varphi_b}{\sum_{b=1}^{8} \omega_b}$$

where
- $\omega_1 = (1-e_{1,2}) \cdot (1-e_{1,3}) \cdot (1-e_{1,5})$,
- $\omega_2 = e_{1,2} \cdot (1-e_{2,4}) \cdot (1-e_{2,6})$,
- $\omega_3 = (1-e_{3,4}) \cdot e_{1,3} \cdot (1-e_{3,7})$,
- $\omega_4 = e_{3,4} \cdot e_{2,4} \cdot (1-e_{4,8})$,
- $\omega_5 = (1-e_{5,6}) \cdot (1-e_{5,7}) \cdot e_{1,5}$,
- $\omega_6 = e_{5,6} \cdot (1-e_{6,8}) \cdot e_{2,6}$,
- $\omega_7 = (1-e_{7,8}) \cdot e_{5,7} \cdot e_{3,7}$,
- $\omega_8 = e_{7,8} \cdot e_{6,8} \cdot e_{4,8}$,
- $e_{1,2}$ is an edge position of a first edge (1,2) in a first set of edges, ($E_r$) of said sets of edges,
- $e_{3,4}$ is an edge position of a second edge (3,4) in the first set of edges ($E_r$),
- $e_{5,6}$ is an edge position of a third edge (5,6) in the first set of edges ($E_r$),
- $e_{7,8}$ is an edge position of a fourth edge (7,8) in the first set of edges ($E_r$),
- $e_{1,3}$ is an edge position of a first edge (1,3) in a second set of edges ($E_s$) of said sets of edges,
- $e_{2,4}$ is an edge position of a second edge (2,4) in the second set of edges ($E_s$),
- $e_{5,7}$ is an edge position of a third edge (5,7) in the second set of edges ($E_s$),
- $e_{6,8}$ is an edge position of a fourth edge (6,8) in the second set of edges ($E_s$),
- $e_{1,5}$ is an edge position of a first edge (1,5) in a third set of edges ($E_t$) in said sets of edges,
- $e_{2,6}$ is an edge position of a second edge (2,6) in the third set of edges ($E_t$),
- $e_{3,7}$ is an edge position of a third edge (3,7) in the third set of edges ($E_t$), and
- $e_{4,8}$ is an edge position of a fourth edge (4,8) in the third set of edges ($E_t$).

7. The method according to claim 6, characterized by determining a position $e_{i,j}(\rho_{SI-b})$ for a particular edge of said sub-block according to:

$$e_{i,j}(\rho_{SI-b}) = C_0^1\left(0, 5 + \frac{\rho_{SI-b}}{2 \min(\delta_i, \delta_j)}\right)$$

where
- $e_{i,j}(\rho_{SI-b}) \in [0,1]$,
- $\delta_i$ and $\delta_j$ denote rim distances of the blocks concerned,
- $(i,j) \in E_\rho$, and
- $\rho$ represents one of the dimensions (r, s, t) of the cubic space.

8. The method according to claim 6, characterized by determining a position $e_{i,j}(\rho_{SI-c})$ for a particular edge of said sub-block according to:

$$e_{i,j}(\rho_{SI-c}) = \begin{cases} C_0^1(0, 5 + \rho_{SI-c}/2\delta_i) & \text{if } \rho < 0 \\ C_0^1(0, 5 + \rho_{SI-c}/2\delta_j) & \text{if } \rho \geq 0 \end{cases}$$

where
- $e_{i,j}(\rho_{SI-c}) \in [0,1]$,
- $\delta_i$ and $\delta_j$ denote rim distances of the blocks concerned,
- $(i,j) \in E_\rho$, and
- $\rho$ represents one of the dimensions (r, s, t) of the cubic space.

9. The method according to claim 6, characterized by determining a position $e_{i,j}(\rho_{SI-a})$ for a particular edge of said sub-block according to:

$$e_{i,j}(\rho_{SI-a}) = C_0^1\left(\frac{\rho_{SI-a} + \delta_i}{\delta_i + \delta_j}\right)$$

where
- $e_{i,j}(\rho_{SI-a}) \in [0,1]$,
- $(i,j) \in E_\rho$, and
- $\rho$ represents one of the dimensions (r, s, t) of the cubic space.

10. The method according to claim 1, characterized by all the data blocks (B1, B2, B3, B4) representing an equally large space of the source data ($D_S$).

11. The method according to claim 1, characterized by the source data ($D_S$) being divided into a number of equally large minimum sub-spaces, and each of the data blocks (B1, B2, B3, B4) representing a space being equivalent to a multiple of one minimum sub-space.

12. The method according to claim 1, characterized by the blocks (B1, B2, B3, B4) being associated with block meta data describing a resolution hierarchy for the source data ($D_S$).

13. The method according to claim 1, characterized by the source data ($D_S$) representing image data and the processing involving rendering a visualization of a particular view of this data.

14. The method according to claim 13, characterized by the level-of-detail being derived from a transfer function, the method comprising:
   applying the transfer function to meta data associated with the source data ($D_S$) to accomplish a level-of-detail selection, and
   decompressing, based on the level-of-detail selection, the source data ($D_S$) into the target data ($D^T$).

15. The method according to claim 13, characterized by deriving the level-of-detail for a particular block (B1, B2, B3, B4) based on at least one of
   a distance between a viewpoint and the block (B1, B2, B3, B4), and
   a view-dependent parameter reflecting whether the block (B1, B2, B3, B4) is visible or not.

16. The method according to claim 14, characterized by the target data ($D_T$) having a format adapted to be computer processed into data for graphical presentation on a display.

17. A computer program product comprising:
   a non-transitory computer readable storage medium having computer readable program code embodied in said medium, said computer-readable program code comprising:
   computer readable program code configured to process source data ($D_S$) into target data ($D_T$), wherein the source data ($D_S$) is divided into a number data blocks (B1, B2, B3, B4) each block representing an information space having at least two dimensions, the blocks (B1, B2, B3, B4) being delimited by a respective set of block edges ($b_1$, $b_2$, $b_3$, $b_4$), the blocks (B1, B2, B3, B4) having at least two selectable resolution levels (r0, r1, r2, r3), where the resolution levels may be selected individually based on a level-of-detail scheme such that different blocks represent information at different resolution levels, characterized by, a block sample boundary ($\beta_{SB}$) around each block (B1, B2, B3, B4) being defined by a set of surfaces spanned by at least one sample which in each respective dimension (r, s, t) of the information space is positioned a longest distance from a geometric (1, 2, 3, 4, 5, 6, 7, 8) point of this block, a rim distance ($\delta_4$) between the block sample boundary ($\beta_{SB4}$) and the block edge ($b_4$) being relatively short for a comparatively high resolution level ($r3$), the rim distance ($\delta_1$) being relatively long for a comparatively low resolution level ($r0$), and the method comprising determining at least one interpolation parameter ($\rho_{SI}$, $e(\rho_{SI})$) for at least one interpolated sample between a first block (B2) neighboring a second block (B3) at least based on a first rim distance ($\delta_2$) of the first block (B2) and a second rim distance ($\delta_3$) of the second block (B3).

18. A system for processing source data ($D_S$) into target data ($D_T$), wherein the source data ($D_S$) is divided into a number data blocks (B1, B2, B3, B4) each block representing an information space having at least two dimensions, the blocks (B1, B2, B3, B4) being delimited by a respective set of block edges ($b_1$, $b_2$, $b_3$, $b_4$), the blocks (B1, B2, B3, B4) having at least two selectable resolution levels ($r0$, $r1$, $r2$, $r3$), where the resolution levels may be selected individually based on a level-of-detail scheme such that different blocks represent information at different resolution levels, the system comprising:

a processor configured to process the source data ($D_S$) into the target data ($D_T$);

an interface circuit adapted to connect to a long-term storage means wherein the source data ($D_S$) is stored, the interface circuit configured to receive the source data ($D_S$) and forward this data ($D_S$) to the processor; and a storage medium configured to store the target data ($D_T$), characterized in that a block sample boundary ($\beta_{SB}$) around each block (B1, B2, B3, B4) is defined by a set of surfaces spanned by at least one sample which in each respective dimension (r, s, t) of the information space is positioned a longest distance from a geometric center point (1, 2, 3, 4, 5, 6, 7, 8) of this block, a rim distance ($\delta_4$) between the block sample boundary ($\beta_{SB4}$) and the block edge ($b_4$) for a comparatively high resolution level ($r3$), and the rim distance ($\delta_1$) for a comparatively low resolution level ($r0$), the processor configured to determine at least one interpolation parameter ($\rho_{SI}$, $e(\rho_{SI})$) for at least one interpolated sample between a first block (B2) neighboring a second block (B3) at least based on a first rim distance ($\delta_2$) of the first block (B2) and a second rim distance ($\delta_3$) of the second block (B3).

19. A system for processing source data ($D_S$) into target data ($D_T$), wherein the source data ($D_S$) is divided into a number data blocks (B1, B2, B3, B4) each block representing an information space having at least two dimensions, the blocks (B1, B2, B3, B4) being delimited by a respective set of block edges ($b_1$, $b_2$, $b_3$, $b_4$), the blocks (B1, B2, B3, B4) having at least two selectable resolution levels ($r0$, $r1$, $r2$, $r3$), where the resolution levels may be selected individually based on a level-of-detail scheme such that different blocks represent information at different resolution levels, the system comprising:

a processing means adapted to process the source data ($D_S$) into the target data ($D_T$), an interface adapted to be connected to a long-term storage means wherein the source data ($D_S$) is stored, the interface being adapted to receive the source data ($D_S$) and forward this data ($D_S$) to the processing means, and a temporary storage means adapted to store the target data ($D_T$), characterized in that a block sample boundary ($\beta^{SB}$) around each block (B1, B2, B3, B4) is defined by a set of surfaces spanned by at least one sample which in each respective dimension (r, s, t) of the information space is positioned a longest distance from a geometric center point (1, 2, 3, 4, 5, 6, 7, 8) of this block, a rim distance ($\delta_4$) between the block sample boundary ($\beta_{SB4}$) and the block edge ($b_4$) is relatively short for a comparatively high resolution level ($r3$), and the rim distance ($\delta_1$) is relatively long for a comparatively low resolution level ($r0$), the processing means in connection with the production of the target data ($D_T$) is adapted to determine at least one interpolation parameter ($\rho_{SI}$, $e(\rho_{SI})$) for at least one interpolated sample between a first block (B2) neighboring a second block (B3) at least based on a first rim distance ($\delta_2$) of the first block (B2) and a second rim distance ($\delta_3$) of the second block (B3).

20. The system according to claim 19, characterized in that the source data ($D_S$) represents three-dimensional information and each data block (B1, B2, B3, B4) represents a respective volumetric information space of the source data ($D_S$).

21. The system according to claim 19, characterized in that the at least one interpolation parameter ($\rho_{SI}$, $e(\rho_{SI})$) includes at least one interpolated sample position ($\rho_{SI}$) and at least one sample value ($e(\rho_{SI})$), and the processing means is adapted to calculate the at least one interpolated sample position ($\rho_{SI}$) and a respective sample value ($e(\rho_{SI})$) associated thereto on the further basis of at least one sample value of the first block (B2) and at least one sample value of the second block (B3).

22. The system according to claim 21, characterized in that each of the blocks (B1, B2, B3, B4) represents a cubic space of a particular volume, and the processing means is adapted to determine the interpolation parameters over the interior of each sub-block eighth (400) of a block which neighbors a block having a resolution level ($r0$, $r1$, $r2$, $r3$) different from the resolution level of the block itself.

23. The system according to claim 22, characterized in that the processing, means is adapted to, for each block intersection (b) of said sub-block, determine an edge weight $e_{i,j}(\rho)$ for each edge of each first and second block adjoining the intersection (b) according to:

$$e_{i,j}(\rho) = \max\left(0, \min\left(1, \frac{\rho + \delta_i}{\delta_i + \delta_j}\right)\right)$$

where $\rho$ is one of the at least one interpolation parameters;

$\rho \in [-\frac{1}{2}, \frac{1}{2}]$, $\delta_i$ is the rim distance of the first block adjacent to the edge along the dimension, and $\delta_j$ is the rim distance of the second block adjacent to the edge along the dimension.

24. The system according to claim 19, characterized in that the blocks (B1, B2, B3, B4) are associated with block meta data describing a resolution hierarchy for the source data ($D_S$).

25. The system according to claim 19, characterized in that the source data ($D_S$) represents image data and the processing means is adapted to render a visualization of a particular view of this data.

26. The system according to claim 25, characterized in that the level-of-detail is derived from a transfer function, and the processing means is configured to:

apply the transfer function to meta data associated with the source data ($D_S$) to accomplish a level-of-detail selection, and decompress the source data ($D_S$) into the target data ($D_T$), based on the level-of-detail selection.

27. The system according to claim 25, characterized in that the level-of-detail for a particular block (B1, B2, B3, B4) is derived based on at least one of
- a distance between a viewpoint and the block (B1, B2, B3, B4), and
- a view-dependent parameter reflecting whether the block (B1, B2, B3, B4) is visible or not.

28. The system according to claim 26, characterized in that the target data ($D_T$) has a format which is adapted to be processed by a graphics processor to provide data for graphical presentation on a display.

* * * * *

UNITED STATES PATENT AND TRADEMARK OFFICE
CERTIFICATE OF CORRECTION

PATENT NO. : 7,940,270 B2
APPLICATION NO. : 11/915233
DATED : May 10, 2011
INVENTOR(S) : Ljung et al.

Page 1 of 1

It is certified that error appears in the above-identified patent and that said Letters Patent is hereby corrected as shown below:

On the Title Page:
Item (57) Abstract, line 10: Please correct "(δ2)" to read -- ($\delta_2$) --

In the Patent:
Column 3, Lines 43-47: Please correct $$\varphi = \frac{\sum_{b=1}^{8} \omega_b \varphi_b}{\sum_{b=1}^{8} \omega_b}$$

to read $$\varphi = \frac{\sum_{b=1}^{8} \omega_b \varphi_b}{\sum_{b=1}^{8} \omega_b}$$

--                                          --

Signed and Sealed this
Sixth Day of December, 2011

David J. Kappos
*Director of the United States Patent and Trademark Office*